9558X
J. Bean.
Grain Winnower.
Patented Mar. 31, 1836.
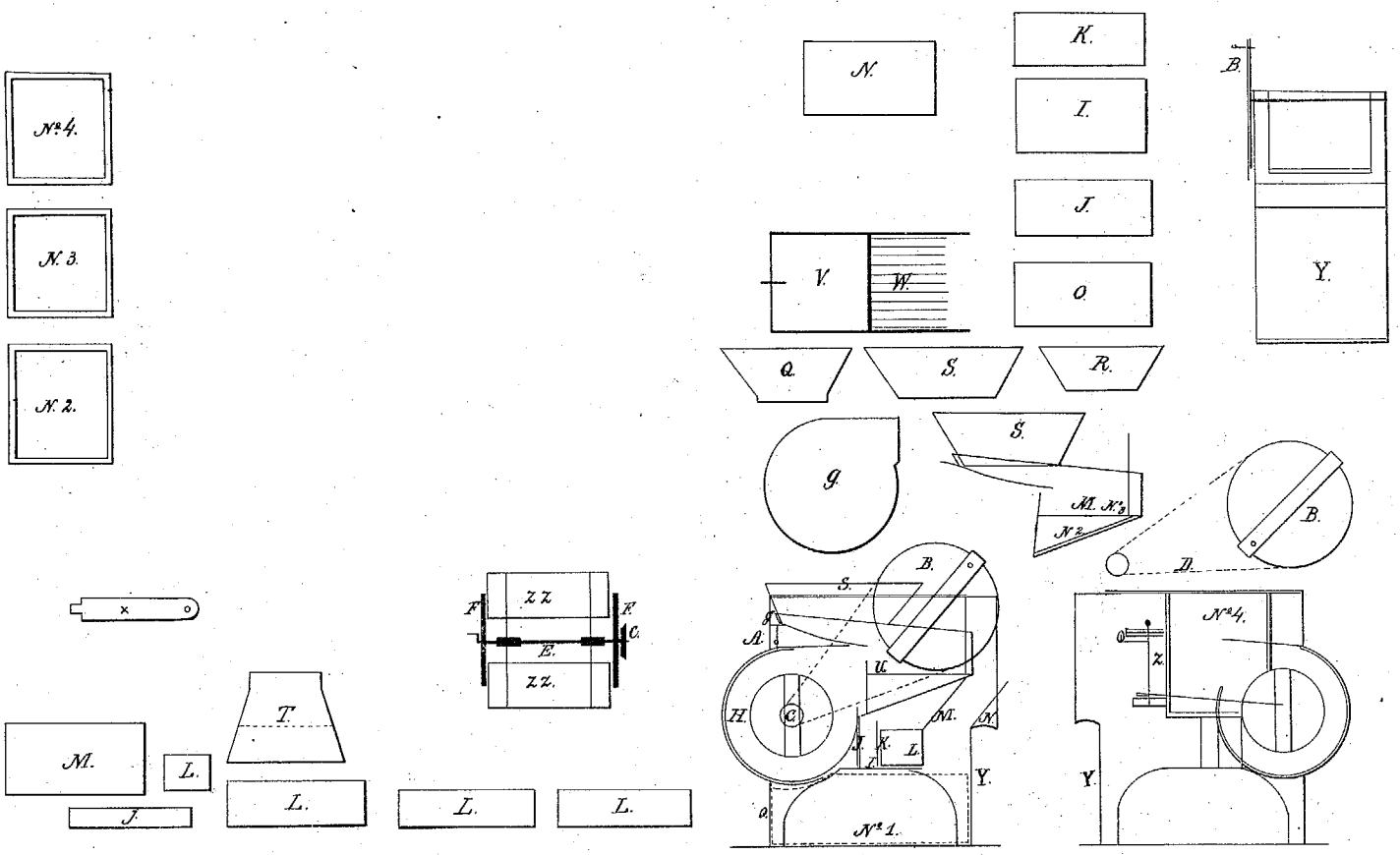

3/31/1836 9558X

March 31, 1836

Jonathan Bean of Montville Maine

Letters Patent

The Schedule referred to in these Letters Patent and making part of the same, containing a description in the words of the said Jonathan Bean himself of his improvement in the machine for winnowing all Kinds of Grain.

To all to whom these Presents may come. Be it Known that I Jonathan Bean of Montville in the County of Waldo and State of Maine have invented a new and useful improvement in a machine for winnowing all Kinds of Grain. and that the following is a full and exact description of the construction and operation of the said machine as invented by me. The advantage of this machine claims above others now in use consists in durability portableness, and expedition in cleaning all Kinds of grain. First. the machine is made of common boards the size for comon use is as follows. The letter A on the draft represents one side of the machine, each side are alike, being two feet nine inches high, and two feet six inches long. There is a piece of hard wood board, three inches wide and two feet six inches long at the top on the inside to nail the Boards to, and a strip one inch wide at the bottom for the same purpose. The bottom is cut out ten inches having legs three inches wide at each end with a curve at the top. the centre of the fore end and of the wind holes is two inches and a half from the edge and fifteen inches and three fourths from the top. the fore end is eighteen inches in diameter which makes a projection of six and a half inches, at the other end there is a piece cut out fifteen inches long and three inches wide from the bottom which serves for a handle.

The wind holes are cut out from the centre of the fore end ten inches and three fourths in diameter. B. represents the wheel it is sixteen inches in diameter, is one inch thick. the edge is a little rounded. a piece of hard wood is put across two inches wide five eighty of an inch thick. and seventeen and a half inches long screwed on the handle goes through it. and through the wheel. The wheel is hung on the right side of the machine one inch and a half from the top, and nine
from the end on a shaft of hard wood one inch and a fourth in diam
eter; and nineteen inches long goes through the opposit side with a gudg
eon five eights of an inch in diameter, a peg goes through to keep
it in. C represents the whirle it is three and a half inches in diam
eter one inch and a fourth thick. with a cap on the outer side projecting
1/2 of an inch to keep the strap on the whirl is attached to the shaft
and is on the right side. D represents the strap it is made of com
_on leather seven eights of an inch wide. about seven feet long with
a buckle to keep it together. this goes round the wheel and round the whirl.
E. represents the shaft is seventeen inches long the gudgeons are either
wood or iron with a crank at one end, it is turned round in the --
middle and at each end a space is left one inch and a half squar
for the arms to go through three inches from the ends. the arms are
four in number five eights of an inch in diameter and eighteen -
inches in length. the shaft is in the centre of the fan curb two &
a half inches from the edge and fifteen inches and three fourths from
the top. F represents the posts that the shaft runs in. they are two
inches wide and one and a half thick, and twelve inches long.
these are let into the sides across the centre of the wind holes and
made fast at the ends with screws G. represents the lining, it is a
board cut in the form of a fan curb eighteen inches in diameter in
the form of a circle except one corner which is left six inches to let
out the wind at the top. one of them is attached to the insides of each
side of the machine to form the fan curb. the centre of which is where
the shaft runs H. represents the fan curb, it is eighteen inches in di
ameter. the centre is fifteen inches and three fourths from the top, and
two and a half from the edge, it is made by bending on thin boards &
nailing them to the lining accepting six inches to let out the wind
I represents the first partition ten inches wide and seventeen and a half
inches and a half long. seven inches of the upper ~~part~~ edge is hollowed
out and forms a part of the fan curb and is placed vertical across the machine and nailed on to the lining at each end. J represents the slide
it is a piece of board sixteen inches long and two and a fourth wide &
is placed between the first and second petition so as to shute the grain
out under the right side of the machiene. K. represents the second
petition it is seven inches wide and seventeen and a half inches long
and is set two and a fourth from the first petition. L represents
the draw to catch the foul seed, it is six inches wide and five deep
and goes in on the right side of the machiene by the side of the second
petition and goes through to the other side of the machiene. M rep
resents the first fall board, it is nine and a half inches wide and
seventeen and a half inches long, one edge is ground out and sets on
the edge of the draw, the other edge goes out to the edge of the fine
sive to run the foul seed into the draw. N represents the second fall
board, it is eighteen inches long nine and a half wide, the sides of
the machine are grooved out to recive it so it may move up and
down as ccasion may require. O represents a board across the ma
chine under the fan curb is eight and a half inches wide and
eighteen and a half long. P represents a board across the machine above
the fan curb is eighteen and a half inches long, and seven and
a half wide the hopper sets on the upper edge of this. Q represents
one end of the hopper it is seventeen inches long at the top
and is nine at the bottom and is seven and a half deep.
both ends are slanted alike. R represents the other end
of the hopper is seventeen inches long at the top and nine and
three fourths at the bottom, is six and a half deep, these ends
are slanted so as to receive the sides. S represents the two
sides of the hopper, they are twenty one inches long at the
top and thirteen at the bottom and seven inches deep, both
ends are slanted alike, the hopper is nailed together and sets
in the top of the machiene. one end rests on the board that
goes across the machiene above the fan curb, the other end
rests on a board that is screwed on to the top across the ma

3/31/1836 9558X

-chiene six inches wide. T represents the hopper follower it is fifteen
inches and a half long. twelve wide and is nine inches long at the bot
tom. and is the same width up three inches from the bottom
and has a joint in the midle and hung with a hing. to turn up
U. represents the sides of the shoe it is twenty five and a half inch
es long on the top the outer end is five inches and three fourths
wide, then it is slanted on the under side fifteen inches and a half
and is twelve inches wide, it is then cut away with a right angle
with the top to three inches wide. from this to the end is a sagment
of half of an inch and is one inch wide at the end; the two
sides are alike they are groved out on the inside to receive the
sives the lower one is half an inch from the edge. the second
grove is a fourth of an inch from the first at the outer edge
and at the other it is five and a half inches from it so that
the upper sive will stand nearly horizontal when hung. The shoe
is hung in the top of the machine [an inch from the [illegible] of the machine] where the fore curb is and
two and a half from the top and four and a half at the other
end; the shoe is hung by having a piece of hard wood attached to
the bottom of the shoe in the centre and projecting one inch and a
half through it, and a peg is fixed in a small piece of wood two
and a half deep and nailed to the board that goes across the top
of the machiene above the fore curb. V represents the the bot
tom is a thin board thirteen and a half inches square, and is nail
ed on to the under and narrow part of the shoe sides to confine
them, a stick goes across the shoe between the sives and pegs
in at the outside to keep it from spreading. W represents fif
teen large wires, the size is No 10, eleven inches long these are put
through a thin piece of hard wood, one inch wide made fast at
each end to the sides of the shoe and forms a part of the shoe bot
tom, the wires run out over the sives and three inches above them
and serve to keep the sives from cloging. Y. represents a board fif
teen inches wide and nineteen inches long and is placed across the machiene under the handles. T. represents the shoe shaker; it is a piece
of round iron half an inch in diameter seven inches long with an
arm at each end three inches long withe a hook at the end
of each arm, the arms stand nearly at right angles with each
other. holes are punched in each end to receive the iron points
that it hangs on. the points that it hangs on are made fast in
pieces of hard wood one inch and a half wide, and screwed on
to the out side of the machiene opesit the shoe the upper point is
a screw, a hole is made through the side of the machine and a
piece of hard wood four inches long goes from the hook of the
shaker to a piece of iron screwed on to the side of the shoe and
a sweep twenty inches long goes from the other hook of the shaker
to the crank which is one inch long X represents a shutter, it
is a thin piece of board ninteen inches long and three wide and
is fastened with a screw to the under part of the left side of the
machine and comes out under the bottom of the right side and cov
ers the spout where the grain comes out, and may be moved as
occasion may require. Z Z represents the fans four in number
sixteen inches long and six inches wide, and one fourth of an inch
thick. these are nailed on to the arms. No 1 represents a partition
under the bottom in the centre is two feet three inches long and
ten inches wide. No 2. represents the fine sive; it is thirteen
and a half wide and fifteen and three fourths inches long, made
of wire webing, the size is No 24. the mashings ten to an inch
nailed to the rim which is one inch wide and half of an inch
thick, this sive goes at the bottom of the shoe to take out the
foul seed. No 3 represents the second sive it is thirteen &
a half inches by fourteen and a half, the wire is No 21, and the
mashing is four to an inch, the rim is one inch wide, and half of
an inch thick. No 4 represents the corse sive, is thirteen and a half inch
es by fourteen and a half the wire is No 20, and the mashing two to an inch
the rim is one inch wide and half of an inch thick Witnesses { Nathan C. Bean
Joseph C. Bean Jonathan K. Bean (Patented March 31. 1836.)